Figure 1:
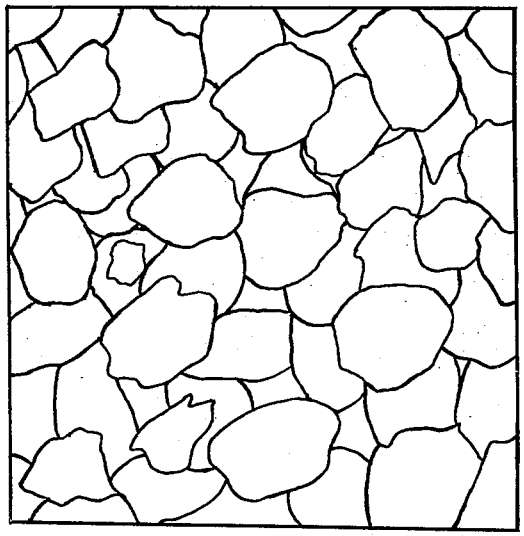

April 5, 1938.  F. G. MAYER  2,113,158
DECORATIVE MATERIAL AND METHOD OF MAKING SAME Filed Aug. 15, 1934

INVENTOR
Frederick G. Mayer
BY
ATTORNEY

Patented Apr. 5, 1938

2,113,158

UNITED STATES PATENT OFFICE

2,113,158

DECORATIVE MATERIAL AND METHOD OF MAKING SAME

Frederick G. Mayer, Morrisville, Pa., assignor to Sloane-Blabon Corporation, Trenton, N. J., a corporation of Delaware Application August 15, 1934, Serial No. 739,857

5 Claims. (Cl. 154—25)

This application is a continuation in part of my application 674,646, filed June 7, 1933, and which was issued as Patent No. 1,975,515 on October 2, 1934.

This invention relates to a decorative material and a method of making the same, and particularly to a material comprised of overlapping leaves of plastic material consolidated into an integral mass, but each leaf retaining a distinctive appearance.

In the manufacture of such plastic material prior to my invention, various decorative effects have been obtained by assembling small pieces of the material, known to the art as scratched composition, having different color characteristics, or otherwise varied surface appearance, and combining these bits of material into an integral mass. In this manner, imitation marble, granite, etc., has been produced, but so far as I am aware, no product has been made prior to my invention by assembling leaves of plastic material, and I have now discovered that in this manner various effects may be obtained which are both pleasing and novel. For example, a material closely resembling terrazzo may be made, as hereinafter more particularly described, and similarly various modernistic effects can be produced.

It is an object of the invention to provide a material which is capable of embodying novel decorative effects and a method by which such effects can be obtained. The invention is applicable to numerous different kinds of plastic material, including linoleum, rubber, resinous plastics, protein plastics, etc., but being of particular advantage as applied to linoleum, will be described as applied to linoleum manufacture.

It is also an object of the invention to place the decorative material, viz., the plastic leaves, on a suitable composition backing which serves to protect the leaves from the blending action of the sheeting means. In this procedure, the entire thickness of the laminated leaves retain the individuality of the designed portions, thereby making the entire thickness of the sheet of leaves useful wearing material.

It is also an object of the invention to provide a base composition material which will acquire a blotchy effect after the sheeting operation. The blotchy effect will more closely simulate the decorative effect of the layer of plastic leaves whereby, after the decorative layer of plastic leaves has been worn through, the flooring material is still usable.

It is a further object of the invention to create a profitable outlet for scrap linoleum composition which accumulates in large quantities in the linoleum industry. The scrap linoleum composition forms a very desirable base for the plastic composition leaves, as will be hereinafter described.

The leaves of the plastic may be formed in any convenient manner, e. g., by pressing or rolling out crumbs of the material, or by forming a sheet and disintegrating it into smaller pieces suitable for assembling in accordance with the invention. In some cases, it will be desirable to produce the more or less serrated edges which result from individually rolling out crumbs, or the ragged edges produced by tearing up a sheet into small leaves. For other effects, it may be more desirable to cut small pieces from a sheet, or to mould the leaves with regular or clean-cut edges. Furthermore, the desired surface appearance of the individual leaves may be controlled according to the practices used in the production of these leaves, e. g., a marbleized, jaspe, or granite effect may be produced in the sheet from which the leaves are cut or torn.

However the leaves are produced, they should be of a size sufficient to stand out in appearance as individual pieces, but ordinarily should be small enough to avoid a daubed appearance. I have found that the most desirable effects are produced with leaves varying in average diameter from about ⅛ in. to 1½ ins., or even somewhat larger. In the process of manufacture, the smaller pieces tend to fall to the bottom, so that a considerable amount of finer material may be tolerated.

These leaves are assembled upon a supporting surface and when compressed are approximately parallel to the surface and are in overlapping relation with each other. The identity of the individual leaves is retained substantially throughout the thickness of the layer of leaves.

The compressing of the leaves and the supporting surface may be done under calender or platen presses, as described in the co-pending application. In the product obtained through the calender rolls under the procedure outlined in application No. 674,646, the outlines of the leaves were not entirely distinct near the bottom of the layer, and there was a tendency toward the loss of individuality of the leaves. I have, however, found that by using a supporting surface composed of sheeted linoleum composition, scrap linoleum composition, rubber composition, and/or equivalent materials, calender rolls will give a finished product superior to the product described in the co-pending application, and at greatly reduced cost of manufacture.

In order to give a fuller understanding of the invention, I have shown in the accompanying drawing, and shall describe below, one embodiment of my invention and the method of its manufacture. This is given merely as an illustration, and is in no way to be taken as limiting the scope of the invention.

Figure 2:
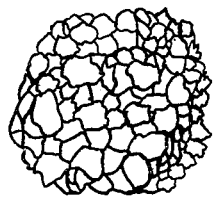
Figure 3:
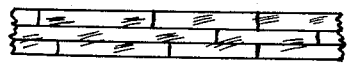
Figure 4:
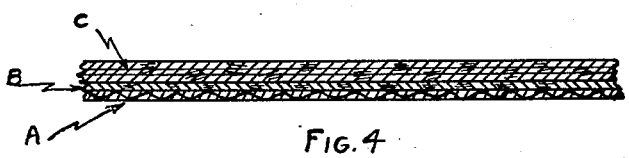

In the accompanying drawing, Fig. 1 shows a terrazzo effect produced according to the present invention;

Fig. 2 shows the leaves from which the product was built up;

Fig. 3 shows an enlarged cross section of the upper layer C in Fig. 4. It discloses the overlapping feature of the leaves with the adjacent ones and the fact that the leaves are substantially parallel with each other and the tread surface; and Fig. 4 is an enlarged section through Fig. 1. It shows the various laminations, that is; A being a suitable backing material as burlap, felt or other equivalent materials; B is a sheeted material of linoleum scrap composition, fresh linoleum composition and/or equivalent plastic materials; C is the layer of leaves compressed into a compact structure to the base composition sheet B.

The leaves C, as shown in Fig. 1 of the drawing, may, as already stated above, be made in various ways, but in the preferred practice of my invention, I first make up a number of sheets having distinctive color characteristics. Where the finished product is to be a terrazzo, these initial sheets are preferably made with a marbleized appearance in the usual way, e. g., the raw materials of linoleum manufacture, such as gelled oil, cork, wood flour, pigments etc., are combined in the usual Jermyn mixer, ofttimes called German mixer. The composition coming from the mixers in the form of "doggies" is sheeted in a two-roll calender, and the resulting sheet then fed to a scratcher which disintegrates it into a granular material. A number of different colors of linoleum in this form are then blended, and the resulting granular mixture of various colors is again sheeted in a two-roll calender. In the resulting sheet, the pieces of various colors are drawn out longitudinally, producing a jaspe effect. To convert this into a marbleized effect, the sheets are cut into squares, and are again run through the calender at right angles to the direction in which they first traveled. In this way, the streaks of various colors are irregularly drawn out sidewise, producing the veined appearance similar to the veining of marble.

All of the above is conventional in linoleum manufacture, and may be replaced by any other steps suitable for producing the color effects or appearance desired for the leaves to be used in the manufacture of the finished product according to the present invention.

The sheet, however produced, may then be broken up into leaves. The preferred method for accomplishing this is to feed the sheet into a beater made, for example, with rotating arms adapted to pass between stationary arms within a cylindrical screen. The sheet being picked up by the rotating arms, is torn between them and the stationary arms until the pieces are small enough to pass through the screen. In the preferred embodiment, the screen will have openings approximately ¾ in., and the leaves which come through the screen will have an average diameter very close to the width of the screen openings.

The leaves from the beater may be used directly but ordinarily I prefer to pass them through a disintegrator which may consist, for example, of a disk having pins projecting from its surface and rotating between disks having pins projecting between the rows of pins on the rotating disk, whereby the leaves from the beater are torn into smaller leaves, e. g., of an average diameter approximately ¼ inch.

The intermediate layer or sheet B is prepared by calendering or pressing under platen presses a quantity of scrap linoleum composition, fresh linoleum composition, rubber composition and/or equivalent plastic composition into sheets. I prefer to use scrap linoleum composition. The sheets are rolled to any desired thickness depending on the thickness of the intended ultimate product, and are then cut into squares for convenient handling.

The scrap linoleum composition used in my intermediate layer sheets is the regular run of raw scrap composition obtained in the manufacture of inlaid linoleums. The scrap material, being in lumpy masses, is fed through the calenders or presses, and sheeted in accordance with the conventional practices followed in the industry. The resulting sheet may be streaked and blotchy depending on the quantities of the numerous colors present in the mass. It is desirable, however, to use colors in this particular sheet which will be of approximately the same shade in color as that of the leaves used in the upper surface. I have found that mixtures of scrap linoleum composition and fresh linoleum composition also form suitable mixtures for the base sheet.

Rubber compositions, scrap rubber compositions and similar plastic compositions have also been found to be suitable supporting bases for the decorative leaves. When scrap rubber compositions are used, it may be convenient to add a small quantity of raw rubber thereto, in order to increase the adhesiveness of the sheeted mass. When rubber compositions are used, the sheeting action is carried on in substantially the same manner as that used in sheeting the linoleum composition.

After the sheets B have been rolled to the required thickness and cut into convenient squares, the above discussed leaves C are placed on the sheets to any desired depth. The leaves lie flat, substantially parallel to the base sheet, and are in over-lapping relation with the adjacent leaves. The leaves are placed and arranged on the sheet by means of a frame having sieve-like openings, approximately ¾ inch mesh, in the base sufficiently large to allow the leaves to filter through. The frame is suspended above the base sheet at a height equivalent to the thickness of the layer of leaves desired.

The average thickness of the base sheet and the leaves is then approximately 4 mm. The layer of leaves may be varied from a thin layer to ¾ of the thickness of the two combined layers. The thickness of the layer of leaves and base sheet may be varied in accordance with that which is considered necessary to produce a high quality product in industrial practice.

The composition sheet B and leaves C are then fed between calender rolls, the leaves being pressed to the base sheet. In this pressing operation, the thickness of the structure is reduced to about 3 mm. Usually after the first pressing operation, the leaves may be distorted in shape, approximately oval in shape.

In order to bring the leaves back, if necessary, to their approximate original shape, the sheet may be passed through the calender rolls at right angles to the original passage. This second passage through the rolls will reduce the thickness of the composition sheet B and leaves C, now a laminated body, to approximately 2.5 mm.

The leaves and base sheet are now an integral structure, the leaves retaining their individual identity throughout the entire thickness of the layer. The composition base sheet appears to have a cushioning effect on the leaves, and prevents the lower layers of leaves from smearing and losing their separate identity as they are compressed into an integral body with the base sheet.

As explained before, the base sheet has a streaked and blotchy effect depending on the colors present in the mass, and this result is particularly advantageous when the sheeted leaves wear through, the base sheet will approximately simulate the sheeted leaves. In this manner, the flooring material can be used for a greater length of time without having any undesirable and displeasing effect to any artistic eye.

As mentioned above, the desirability of having the base sheet of substantially the same shade in color as the layer of leaves is thus quite apparent in view of the greater period of usability of the flooring material.

During the calendering operations, it is preferable to have the surface of the sheet against a cold roll, although it may be heated. The lower roll is ordinarily, but not necessarily heated.

After the base sheet and leaves are compressed as described into an integral body, the body is cut into tesserae of any desired shape or form, and assembled on a suitable backing as burlap, felt or its equivalent. The tesserae are then pressed to the backing A in accordance with well known practices followed in the manufacture of inlaid linoleum.

Although I have described above a particular procedure for producing a decorative material according to my invention, it is to be understood that the invention is in no way limited to such procedure, or to the particular product resulting therefrom, but, on the contrary, many changes and variations may be made, and numerous other materials may be used without departing from the spirit or the scope of my invention.

I claim:

1. The method of forming a decorative floor material which comprises sheeting a quantity of plastic composition, depositing leaves of a plastic material in substantially parallel overlapping relation on the sheeted plastic composition, finally compressing the structure into an integral mass, placing the compressed mass on a suitable backing and compressing the product into a unitary sheet.

2. The method of forming a decorative floor material which comprises sheeting a quantity of linoleum composition, depositing leaves of a plastic material in substantially parallel overlapping relation on the sheet of linoleum, finally compressing the structure into an integral mass, placing the compressed mass on a suitable backing and compressing the product into a unitary sheet.

3. The method of forming a decorative floor material which comprises forming a base sheet by passing a quantity of linoleum through compressing means, assembling several layers of leaves of plastic material in substantially parallel overlapping relation on the base sheet, finally compressing the structure into a dense mass, said leaves having distinctive colorings so that when assembled and compressed the individuality of each leaf is substantially retained, placing the compressed mass on a suitable backing and compressing the product into a unitary sheet.

4. The method of forming a decorative floor material which comprises forming a base sheet by passing a quantity of rubber composition through compressing means, assembling several layers of leaves of plastic material in substantially parallel overlapping relation on the base sheet, finally compressing the structure into a dense mass, said leaves having distinctive colorings so that when assembled and compressed the individuality of each leaf is substantially retained, placing the compressed mass on a suitable backing and compressing the product into a unitary sheet.

5. The method of forming a decorative floor material which comprises forming a composition sheet by passing a quantity of linoleum composition through a compressing means, assembling layers of preformed plastic leaves in substantially parallel overlapping relation on the composition sheet, compressing the assembled leaves and sheet into a compact structure, dividing the structure into tesserae, assembling the tesserae on a suitable backing, finally compressing the tesserae and the backing into an integral body.

FREDERICK G. MAYER.